United States Patent [19]
Takeuchi et al.

[11] Patent Number: 5,705,913
[45] Date of Patent: Jan. 6, 1998

[54] OVERDISCHARGE DETECTION DEVICE AND OVERDISCHARGE PREVENTION DEVICE FOR A CHARGEABLE ELECTRIC CELL, OPERABLE WITH A VARIABLE THRESHOLD VOLTAGE TO PROHIBIT DISCHARGE IN ACCORDANCE WITH RELATIVE WEIGHT OF A LOAD

[75] Inventors: Masaru Takeuchi; Yasuhisa Higashijima; Tomonori Tsuchiya, all of Atsugi, Japan

[73] Assignee: Mitsumi Electric Co., Ltd., Tokyo, Japan

[21] Appl. No.: 590,100

[22] Filed: Jan. 24, 1996

[30] Foreign Application Priority Data

Jan. 31, 1995 [JP] Japan ................... 7-014748
Jul. 28, 1995 [JP] Japan ................... 7-193252

[51] Int. Cl.[6] ................................... H02J 7/00
[52] U.S. Cl. ...................... 320/13; 320/39; 320/32
[58] Field of Search ...................... 320/13, 14, 39, 320/40, 30–33

[56] References Cited

U.S. PATENT DOCUMENTS

| | | |
|---|---|---|
| 4,210,855 | 7/1980 | Harer et al. ................... 320/13 |
| 4,509,102 | 4/1985 | Ayer ................... 320/48 X |
| 4,703,247 | 10/1987 | Morioka ................... 320/13 |
| 5,130,633 | 7/1992 | Maruichi ................... 320/13 |
| 5,138,246 | 8/1992 | Kobayashi ................... 320/13 |
| 5,159,257 | 10/1992 | Oka et al. ................... 320/13 |
| 5,296,997 | 3/1994 | Betton et al. ................... 320/13 |
| 5,343,137 | 8/1994 | Kitaoka et al. ................... 320/13 |
| 5,477,124 | 12/1995 | Tamai ................... 320/13 |
| 5,479,084 | 12/1995 | Satsuma et al. ................... 320/13 |
| 5,547,775 | 8/1996 | Eguchi et al. ................... 320/39 X |

*Primary Examiner*—Peter S. Wong
*Assistant Examiner*—K. Shin
*Attorney, Agent, or Firm*—Frishauf, Holtz, Goodman, Langer & Chick, P.C.

[57] ABSTRACT

In an overdischarge detection device which is connected between positive and negative load current lines for connecting a chargeable electric cell with a load and which comprises an overdischarge detection circuit including a voltage comparing section for detecting that a cell voltage of the electric cell falls below a threshold voltage to prohibit discharging operation, an adjusting circuit connected to the overdischarge detection circuit detects a particular voltage of a specified part that corresponds to a load current varying in response to relative weight of the load to adjust the threshold voltage on the basis of the particular voltage. Preferably, the adjusting circuit may be constructed so as to clamp the threshold voltage when the particular voltage is higher than a predetermined voltage.

10 Claims, 8 Drawing Sheets

OVERDISCHARGE DETECTION DEVICE AND OVERDISCHARGE PREVENTION DEVICE FOR A CHARGEABLE ELECTRIC CELL, OPERABLE WITH A VARIABLE THRESHOLD VOLTAGE TO PROHIBIT DISCHARGE IN ACCORDANCE WITH RELATIVE WEIGHT OF A LOAD

BACKGROUND OF THE INVENTION

This invention relates to a protection device for use in a cell unit comprising a chargeable electric cell such as a lithium ion cell and, in particular, to an overdischarge detection device for detecting overdischarge of the electric cell and an overdischarge prevention device for preventing overdischarge of the electric cell.

Among various types of chargeable electric cells, a lithium ion cell is particularly weak against overdischarge. In this connection, it is essential to provide an overdischarge detection device for detecting an overdischarged condition and an overdischarge prevention device for preventing overdischarge.

In general, a cell unit includes a lithium ion cell (hereinafter simply called an electric cell) and the overdischarge detection device. In the cell unit, the electric cell is connected in parallel to the overdischarge detection device. A conventional overdischarge detection device consists of an overdischarge detection circuit alone. The overdischarge detection circuit is for comparing a cell voltage of the electric cell with a threshold voltage which will later be described. When the cell voltage is lower than the threshold voltage, it is judged that the electric cell is overdischarged. At that time, a discharge control switch consisting of a semiconductor switch is turned off. Thus, a load connected between positive and negative load current lines is electrically disconnected from the electric cell to inhibit a discharging operation. The threshold voltage is, for example, set in several tens of percent of the cell voltage on full charged. A combination of the overdischarge detection circuit and the discharge control switch serves as an overdischarge prevention device.

The cell unit also comprises an overcurrent detection circuit for prohibiting a discharging operation under an overcurrent condition. The overcurrent detection circuit equivalently detects a load current on the basis of a voltage drop in the discharge control switch. That is, the discharge control switch, which is the semiconductor switch, is equivalently indicated by a low resistor (hereinafter called an on-resistor) when it is turned on. The on-resistor has a much lower resistance than that of the load. The overcurrent detection circuit detects the load current flowing through the load using the voltage drop in the on-resistor. The cell unit further comprises an overcharge prevention device for stopping a charging operation when the cell voltage exceeds a predetermined voltage during the charging operation.

In general, the cell voltage of the electric cell falls by the product of the load current and an internal impedance in the electric cell. In addition, both a degree of the voltage drop in the cell voltage and a degree of return of the cell voltage (voltage rise in the cell voltage) after stopping of the discharging operation are directly proportional to magnitude of the load current during the discharging operation.

As a result, in the overdischarge detection device (the overdischarge prevention device) determining the threshold voltage to stop the discharging operation on the basis of a value of the voltage, it is necessary to set the above-mentioned threshold voltage or a return hysteresis voltage for the overcurrent detection circuit against the return of the cell voltage after stopping the discharging operation by the value corresponding to the magnitude of the load current. The load current has an average value and a maximum value both of which are different in dependence on a relative weight of the load to be connected to the cell unit.

Accordingly, it is desirable that the overdischarge detection device (the overdischarge prevention device) has a threshold voltage corresponding to the relative weight of the load. However, a known overdischarge detection device (a known overdischarge prevention device) has a constant threshold voltage and can therefore not operate in consideration of the relative weight of the load.

Although the discharging operation of the electric cell is inhibited after the electric cell is used until a cell's remaining capacity decreases to about 10 percent of its full charge, the following problems occur in the prior art devices wherein the threshold voltage to inhibit the discharging operation is set at a constant value. That is, inasmuch as the degree of voltage drop in the cell voltage is different in dependence on the relative weight of the load as described above, the discharging operation of the electric cell is inhibited when the cell's remaining capacity runs short of when it has much less than 10 percent of its full charge on light load. On the contrary, on heavy load, the discharging operation of the electric cell is inhibited although the cell's remaining capacity is adequate or when it has much more than 10 percent of its full charge.

In addition, in a manner which will later be described in conjunction with FIGS. 6 and 7 in detail, when the above-mentioned threshold voltage decreases with linearly dependence on the voltage drop in the semiconductor switch, the threshold voltage is too low on stopping of the discharging operation of the electric cell. Accordingly, it is desirable that the threshold voltage is clamped at a time when the voltage drop is higher than a predetermined voltage.

SUMMARY OF THE INVENTION

It is therefore an object of this invention to provide an overdischarge detection device (an overdischarge prevention device) for a chargeable electric cell and for general-purpose, which is capable of changing a threshold voltage to inhibit a discharging operation in accordance with a relative weight of a load.

It is another object of this invention to provide an overdischarge detection device (an overdischarge prevention device) for a chargeable electric cell of the type described, which is capable of clamping the above-mentioned threshold voltage at a time when a voltage drop in a discharge control switch is higher than a predetermined voltage.

Other objects of this invention will become clear as the description proceeds.

According to a first aspect of this invention, an overdischarge detection device is for use in a cell unit including a chargeable electric cell having a cell voltage which is supplied to a load through positive and negative load current lines to pass a load current through the load. The overdischarge detection device comprises an overdischarge detection circuit connected between the positive and the negative load current lines. The overdischarge detection circuit includes a voltage comparing section having an input terminal for the cell voltage and a threshold terminal for a controllable threshold voltage to prohibit discharge. The voltage comparing section compares the cell voltage with the controllable threshold voltage to produce a detection signal when the cell voltage falls below the controllable threshold voltage. Connected to the overdischarge detection circuit, adjusting means detects a particular voltage of a predetermined part in the cell unit that corresponds to the load current varying in response to relative weight of the load to adjust the controllable threshold voltage on the basis of the particular voltage.

According to a second aspect of this invention, an overdischarge prevention device is for use in a cell unit including a chargeable electric cell having a cell voltage which is supplied to a load through positive and negative load current lines to pass a load current through the load. The overdischarge prevention device comprises an overdischarge detection circuit connected between the positive and the negative load current lines. The overdischarge detection circuit includes a voltage comparing section having an input terminal for the cell voltage and a threshold terminal for a controllable threshold voltage to prohibit discharge. The voltage comparing section compares the cell voltage with the controllable threshold voltage to produce a detection signal when the cell voltage falls below the controllable threshold voltage. Connected to the overdischarge detection circuit, a switch circuit stops, in response to the detection signal, supply of the cell voltage from the electric cell to the load. Connected to the overdischarge detection circuit, adjusting means detects a particular voltage of a predetermined part in the cell unit that corresponds to the load current varying in response to relative weight of the load and for adjusting the controllable threshold voltage on the basis of the particular voltage.

DESCRIPTION OF THE PREFERRED EMBODIMENTS

Figure 1:
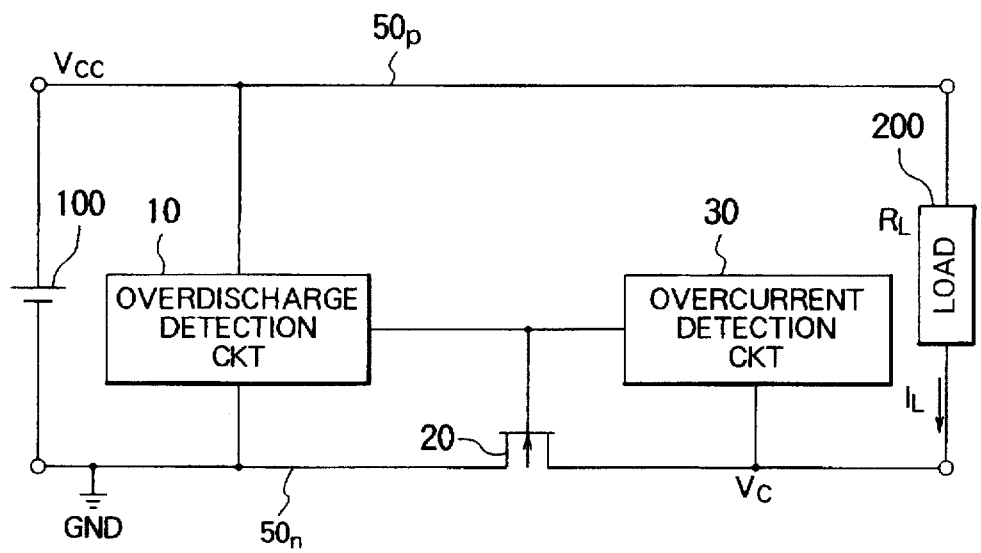
FIG. 1 is a block diagram of a conventional cell unit including an overdischarge detection device for a chargeable electric cell.

Referring to FIG. 1, a cell unit including a lithium ion cell provided with a conventional overdischarge detection device will at first be described in order to facilitate an understanding of the present invention. In the illustrated cell unit, an overdischarge detection circuit 10 is connected between positive and negative load current lines 50p and 50n which connect a chargeable electric cell 100 with a load 200. A conventional overdischarge detection device consists of the overdischarge detection circuit 10 alone. The overdischarge detection circuit 10 is for comparing a cell voltage $V_{cc}$ of the electric cell 100 with a threshold voltage which will later be described. When the cell voltage $V_{cc}$ is lower than the threshold voltage, it is judged that the electric cell 100 is overdischarged and then a discharge control switch 20 consisting of a semiconductor switch is turned off. Thus, the load 200 connected between the positive and the negative load current lines 50p and 50n is electrically disconnected from the electric cell 100 to inhibit a discharging operation. The threshold voltage is, for example, set in several tens of percent of the cell voltage $V_{cc}$ on full overdischarged. A combination of the overdischarge detection circuit and the discharge control switch serves as an overdischarge prevention device.

The illustrated cell unit also comprises an overcurrent detection circuit 30. The overcurrent detection circuit 30 equivalently detects a load current $I_L$ the basis of a voltage drop in the discharge control switch 20. That is, the discharge control switch, which is the semiconductor switch, is equivalently indicated by a low resistor (hereinafter called an on-resistor) when it is turned on. The on-resistor has a very lower resistance $R_{on}$ than a load resistance $R_L$ of the load 200, namely:

$$R_{on} \ll R_L.$$

The overcurrent detection circuit 30 detects the load current $I_L$ flowing through the load 200 using a voltage drop $V_c$ in the on-resistor. In addition, the cell unit further comprises an overcharge prevention device (not shown) for stopping a charging operation when the cell voltage $V_{cc}$ exceeds a predetermined voltage during the charging operation.

Figure 2:
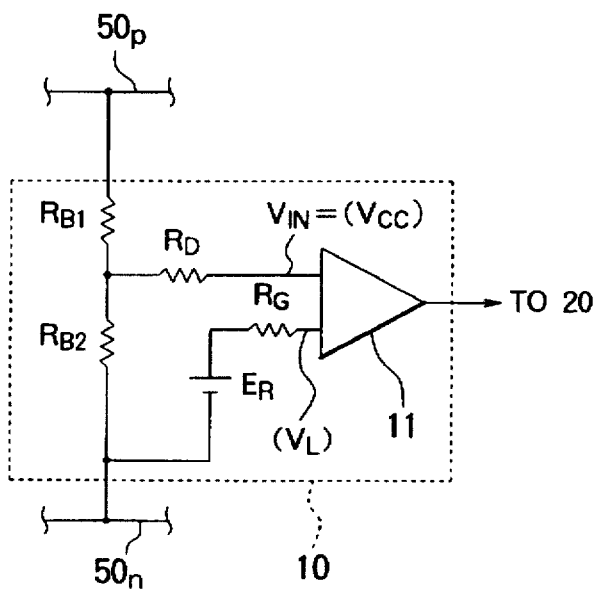
FIG. 2 is a circuit diagram of an overdischarge detection circuit illustrated in FIG. 1.

Referring to FIG. 2, the overdischarge detection circuit 10 comprises a reference voltage generating source $E_R$ for setting a threshold voltage $V_L$, bleeder resistors $R_{B1}$ and $R_{B2}$, a detection input resistor $R_D$, a reference voltage resistor $R_G$, and a comparator 11. The comparator 11 has an input terminal supplied with, as an input voltage $V_{IN}$, a voltage ($V_{cc}$) directly proportional to the cell voltage $V_{cc}$ and another input terminal with a voltage ($V_L$) directly proportional to the threshold voltage $V_L$.

However, the conventional overdischarge detection device (the conventional overdischarge prevention device) has the constant threshold voltage $V_L$ and can therefore not operate in consideration of a relative weight of the load 200, as mentioned in the preamble of the instant specification.

Figure 3:
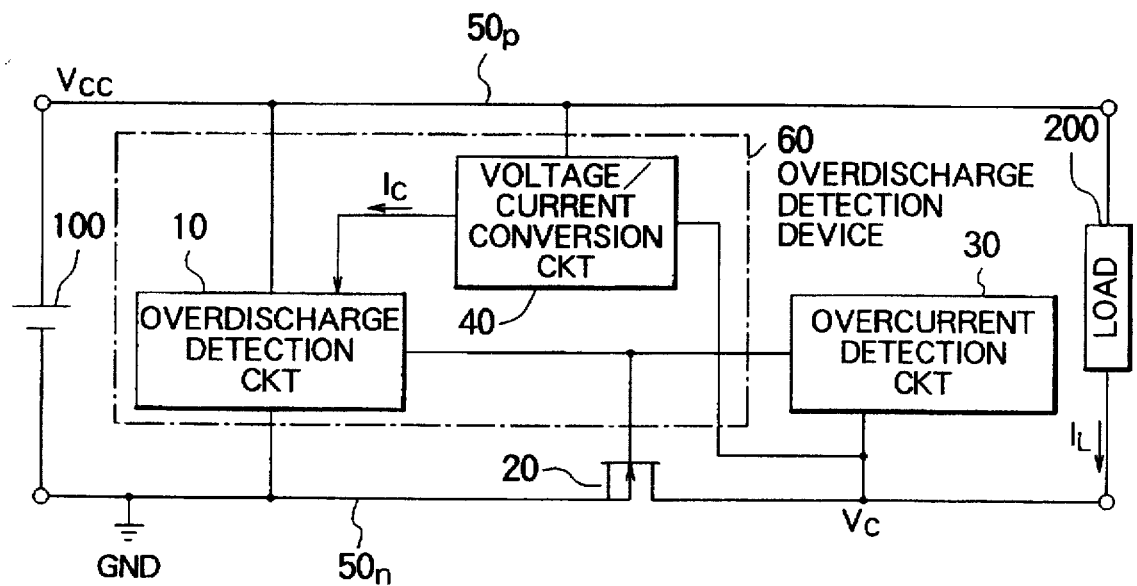
FIG. 3 is a block diagram of a cell unit to which an overdischarge detection device for a chargeable electric cell according to a first embodiment of this invention is applied.

Referring to FIG. 3, an illustrated cell unit comprises the electric cell 100, the overcurrent detection circuit 30, the discharge control switch 20, and an overdischarge detection device 60 according to a first embodiment of this invention. The cell unit also actually comprises the overcharge prevention device in the manner similar to the prior art but its illustration and description thereto is omitted because it has nothing to do with scope of this invention.

The illustrated overdischarge detection device 60 comprises the overdischarge detection circuit 10 and a voltage/current conversion circuit 40. The voltage/current conversion circuit 40 serves as a voltage adjusting circuit for detecting a particular voltage $V_c$ of a specified part in the cell unit that corresponds to the load current $I_L$ in response to relative weight of the load 200 to adjust the input voltage $V_{IN}$ of the overdischarge detection circuit 10 on the basis of the particular voltage $V_c$. In the example being illustrated, the voltage/current conversion circuit 40 detects the particular voltage $V_c$ as a voltage between a source electrode and a drain electrode (hereinafter simply called a between-source-and-drain voltage) of the discharge control switch 20 consisting of the semiconductor switch. The particular voltage $V_c$ is equal to the product of the on-resistance $R_{on}$ between the source electrode and the drain electrode of the discharge control switch 20 and the load current $I_L$. That is:

$$V_c = R_{on} \times I_L \quad (1)$$

The voltage/current conversion circuit 40 converts the particular voltage $V_c$ into a control current $I_c$ which is directly proportional to the magnitude of the particular voltage $V_c$. The control current $I_c$ is supplied to the overdischarge detection circuit 10.

Figure 4:
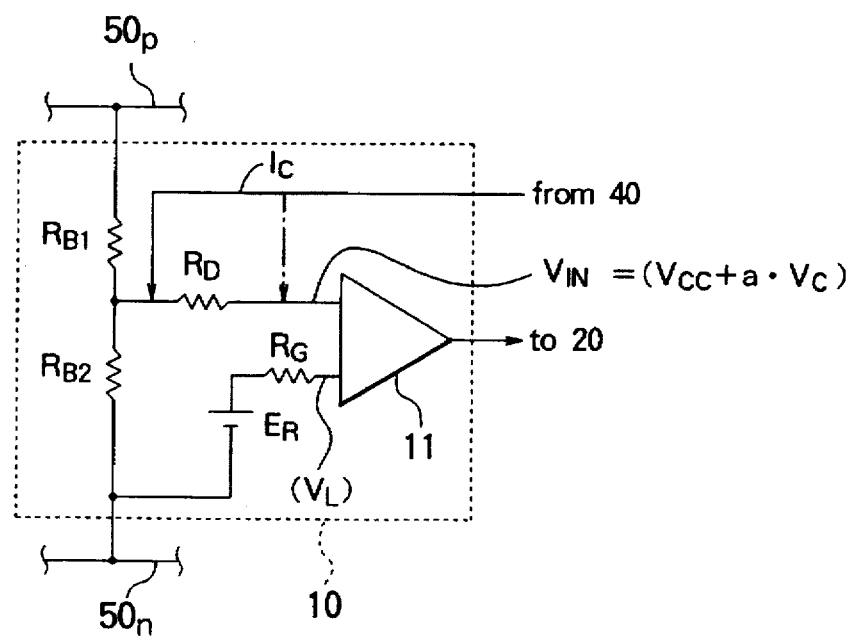
FIG. 4 is a circuit diagram of an overdischarge detection circuit illustrated in FIG. 3.

Turning to FIG. 4, the overdischarge detection circuit 10, which is similar to that illustrated in FIG. 2, comprises the reference voltage generating source $E_R$ for setting the fixed threshold voltage $V_L$, the bleeder resistors $R_{B1}$ and $R_{B2}$, the detection input resistor $R_D$, the reference voltage resistor $R_G$, and the comparator 11. The control current $I_c$ is supplied to an end of the detection input resistor $R_D$ on the bleeder resistors side as illustrated in a solid line in FIG. 4. As a result, the comparator 11 is supplied with, as the input voltage $V_{IN}$, a voltage ($V_{cc}+a\cdot V_c$) which is directly proportional to a voltage obtained by adding the cell voltage $V_{cc}$ to a control voltage $a\cdot V_c$. That is:

$$V_{IN} = (V_{cc} + a \cdot V_c) \quad (2)$$

where "a" represents a predetermined coefficient. This is considered that the controllable threshold voltage $V_{th}$ is reduced from the fixed threshold voltage $V_L$ by the control voltage $a\cdot V_c$, although the fixed threshold voltage $V_L$ is really constant. That is:

$$V_{th} = V_L - a \cdot V_c \quad (3)$$

Thus, the voltage/current conversion circuit 40 can change the controllable threshold voltage $V_{th}$ using the control current $I_c$. In addition, the control current $I_c$ may be supplied to another end of the detection input resistor $R_D$ on the comparator 11 side as illustrated at a dash-and-dot line in FIG. 4.

Figure 5:
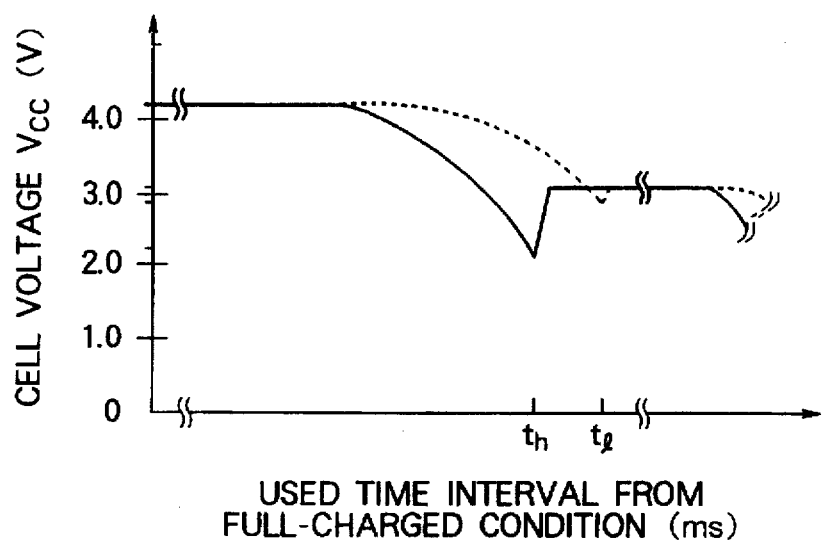
FIG. 5 is a view for use in describing operation of the overdischarge detection circuit illustrated in FIG. 3.

Referring to FIG. 5 in addition to FIG. 3, description will proceed to operation of the overdischarge detection device illustrated in FIG. 3. In FIG. 5, the abscissa represents a used time interval [mS] elapsed since the electric cell 100 is put into a full-charged condition and the ordinate represents the cell voltage $V_{cc}$ [V] of the electric cell 100. It is assumed that the electric cell has a full-charged voltage of 4.2 [V] and that the fixed threshold voltage $V_L$ is set in 2.8 [V]. In FIG. 3, a broken line indicates a characteristic of the cell voltage $V_{cc}$ in a case where the load 200 is light and a solid line indicates another characteristic of the cell voltage $V_{cc}$ in another case where the load 200 is heavy.

Description will first proceed to an operation in the case where the load 200 is light. In this event, as shown at the broken line in FIG. 5, the cell voltage $V_{cc}$ drops from the full-charged voltage of 4.2 [V] as the electric cell 100 is used. The voltage/current conversion circuit 40 detects the particular voltage $V_c$ corresponding to the load current $I_L$ to allow the control current $I_c$ directly proportional to the particular voltage $V_c$ to flow in the overdischarge detection circuit 10. Inasmuch as the load 200 is light, the control current $I_c$ has a little magnitude. As a result, the overdischarge detection circuit 10 has the controllable threshold voltage $V_{th}$ which is nearly equal to the fixed threshold voltage $V_L$ of 2.8 [V]. Accordingly, when the electric cell 100 has the cell voltage $V_{cc}$ which drops below about 2.8 [V] at a time instant $t_l$, the comparator 11 produces a detection signal so that the discharge control switch 20 is turned off. Thereafter, when the electric cell 100 has the cell voltage $V_{cc}$ which rises up to a predetermined voltage of, for example, 3.1 [V] that is determined by a hysteresis characteristic in the overdischarge detection circuit 10, the discharge control switch 20 is turned on to resume the discharging operation of the electric cell 100.

Description will proceed to another operation in the case where the load 200 is heavy. In this event, as shown at the solid line in FIG. 5, the cell voltage $V_{cc}$ drops from the full-charged voltage of 4.2 [V] as the electric cell 100 is used. The voltage/current conversion circuit 40 detects the particular voltage $V_c$ corresponding to the load current $I_L$ to allow the control current $I_c$ directly proportional to the particular voltage $V_c$ to flow in the overdischarge detection circuit 10. Inasmuch as the load 200 is heavy, the control current $I_c$ has a much magnitude. As a result, the overdischarge detection circuit 10 has the controllable threshold voltage $V_{th}$ which is, for example, equal to 2.2 [V] lower than the fixed threshold voltage $V_L$ of 2.8 [V]. Accordingly, when the electric cell 100 has the cell voltage $V_{cc}$ which drops below 2.2 [V] at a time instant $t_h$, the comparator 11 produces the detection signal so that the discharge control switch 20 is turned off. Thereafter, when the electric cell 100 has the cell voltage $V_{cc}$ which rises up to the above-mentioned predetermined voltage, the discharge control switch 20 is turned on to resume the discharging operation of the electric cell 100.

Figure 6:
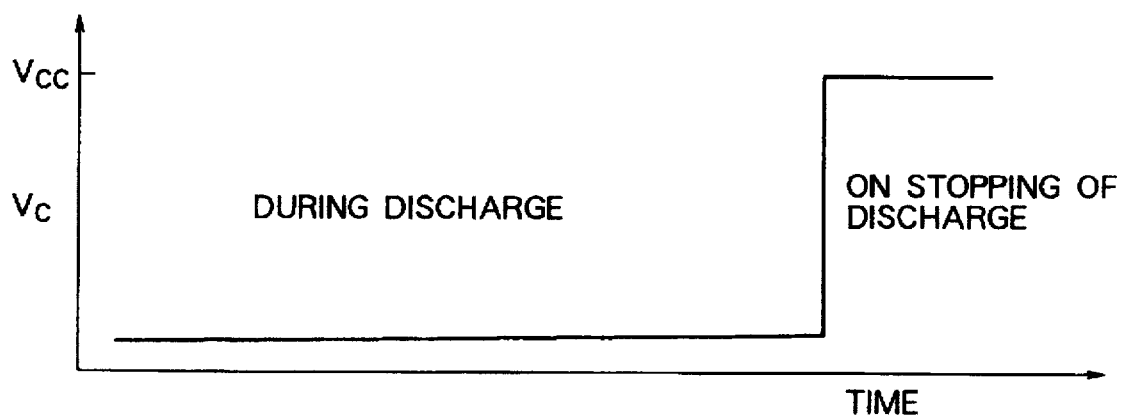
FIG. 6 is a view showing characteristic of a voltage drop in a semiconductor switch on discharging and stopping of discharge in an electric cell.
Figure 7:
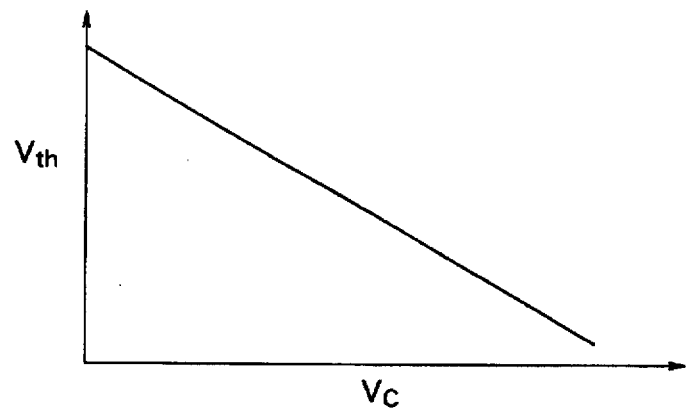
FIG. 7 is a view showing an example of characteristic in a case where a threshold voltage varies in accordance with the above-mentioned threshold voltage.

Referring to FIGS. 6 and 7, description will proceed to malfunction in the overdischarge detection device in a case the above-mentioned controllable threshold voltage $V_{th}$ is controlled on the basis of the voltage drop (the particular voltage) $V_c$ in the semiconductor switch 20. That is, when the semiconductor switch 20 is turned off to stop the discharging operation of the electric cell 100, the semiconductor switch 20 equivalently acts as a diode connected from a ground GND to the load 200 in a forward direction. Accordingly, while the semiconductor switch 20 has an extremely lower on-resistance $R_{on}$ than the load resistance $R_L$ during the discharging operation of the electric cell 100, namely:

$$R_{on} \ll R_L,$$

the semiconductor switch 20 has a high impedance on stopping of the discharging operation of the electric cell 100. That is, the diode (the semiconductor 20) has a reverse resistance (an off-resistance) $R_{off}$ which is extremely higher than the load resistance $R_L$, namely;

$R_{off} \gg R_L$.

As a result, as shown in FIG. 6, while the particular voltage $V_c$ is sufficiently lower than the cell voltage $V_{cc}$ during the discharging operation, the particular voltage $V_c$ rises up to about the cell voltage $V_{cc}$ on stopping of the discharging operation of the electric cell 100. Accordingly, as shown in FIG. 7, when the above-mentioned controllable threshold voltage $V_{th}$ decreases with linearly dependent on the voltage drop $V_c$ in the semiconductor switch 20, the controllable threshold voltage $V_{th}$ drops too much on stopping of the discharging operation of the electric cell 100. It is therefore desirable that the controllable threshold voltage $V_{th}$ is clamped at a time when the particular voltage $V_c$ is higher than a predetermined voltage.

Figure 8:
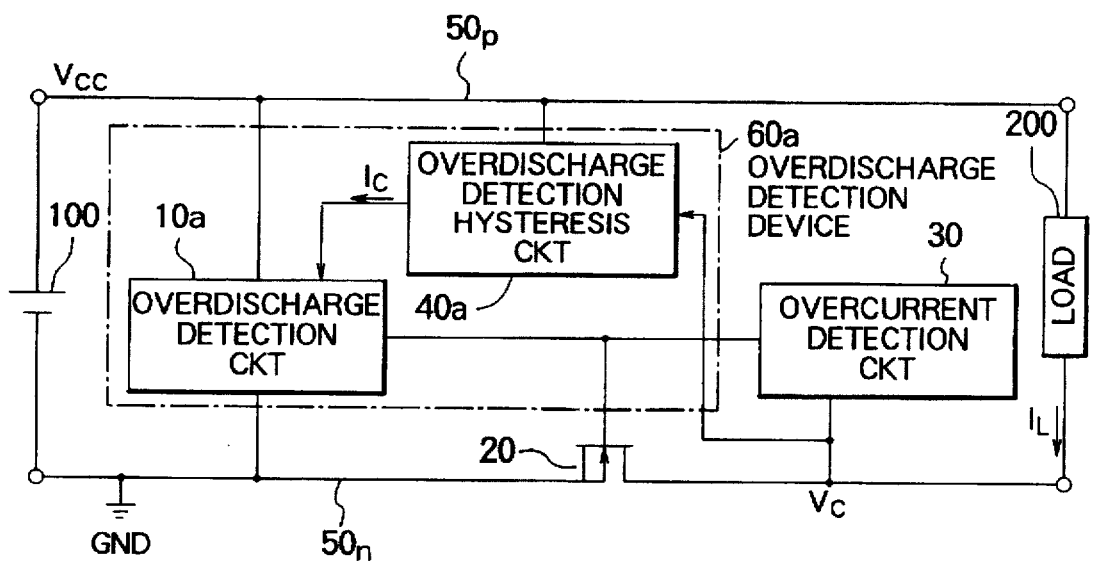
FIG. 8 is a block diagram of a cell unit to which an overdischarge detection device for a chargeable electric cell according to a second embodiment of this invention is applied.

Referring to FIG. 8, an illustrated cell unit comprises the electric cell 100, the overcurrent detection circuit 30, the discharge control switch 20, and an overdischarge detection device 60a according to a second embodiment of this invention. The cell unit also actually comprises the overcharge prevention device in the manner similar to the prior art but its illustration and description thereto is omitted because it has nothing to do with scope of this invention.

The overdischarge detection device 60a comprises an overdischarge detection circuit 10a and an overdischarge detection hysteresis circuit 40a. The overdischarge detection hysteresis circuit 40a changes a controllable threshold voltage $V_{th}$ on the basis of the voltage drop (the particular voltage) $V_c$ in the discharge control switch 20 in the manner which will later be described but clamps the controllable threshold voltage $V_{th}$ when the voltage drop $V_c$ is higher than a predetermined voltage. More specifically, the overdischarge detection hysteresis circuit 40a changes the controllable threshold voltage $V_{th}$ by changing the control current $I_c$ supplied to the overdischarge detection circuit 10.

The overdischarge detection circuit 10 is connected in parallel to the electric cell 100. The overdischarge detection circuit 10 compares the cell voltage $V_{cc}$ with the controllable threshold voltage $V_{th}$. When the cell voltage $V_{cc}$ is lower than the controllable threshold voltage $V_{th}$, the overdischarge detection circuit 10 judges that the electric cell 100 is overdischarge and then makes the discharge control switch 20 consisting of a semiconductor switch turn off. Thus the load 200 connected between the positive and the negative load current lines 50p and 50n is electrically disconnected from the electric cell 100 to inhibit a discharge operation.

Figure 9:
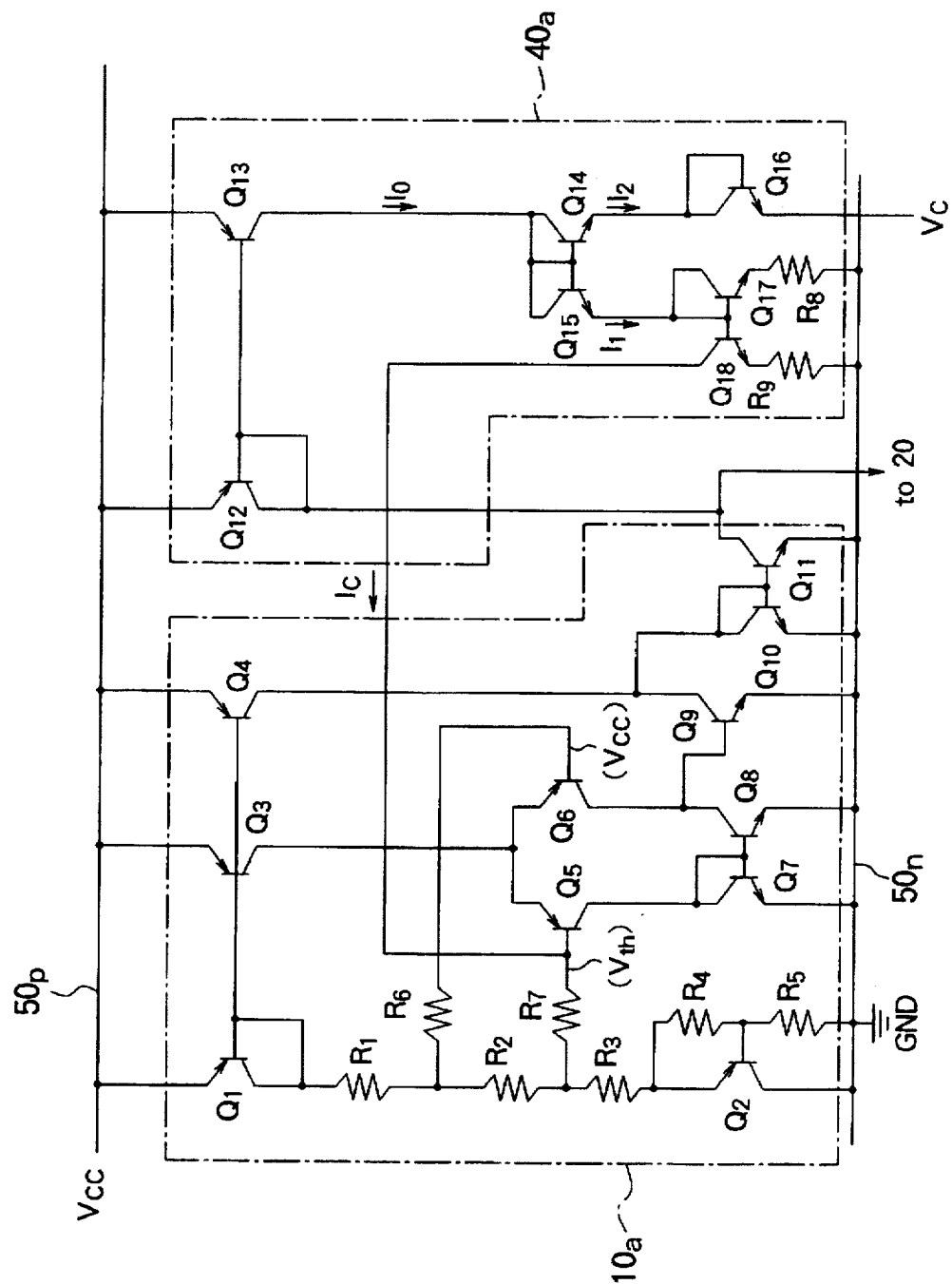
FIG. 9 is a circuit diagram of an example of an overdischarge detection circuit illustrated in FIG. 8 in detail.

FIG. 9 shows an example of the overdischarge detection device 60a (the overdischarge detection circuit 10a and the overdischarge detection hysteresis circuit 40a) in detail.

The overdischarge detection circuit 10a comprises a plurality of resistors $R_1$, $R_2$, $R_3$, $R_4$, $R_5$, $R_6$, and $R_7$, and a plurality of transistors $Q_1$, $Q_2$, $Q_3$, $Q_4$, $Q_5$, $Q_6$, $Q_7$, $Q_8$, $Q_9$, $Q_{10}$, and $Q_{11}$. Between the positive and the negative load current lines 50a and 50n, the transistor $Q_1$, the resistors $R_1$, $R_2$, and $R_3$, and the transistor $Q_2$ are connected in series. The transistor $Q_2$ has an emitter electrode and a base electrode which the resistor $R_4$ is connected therebetween and the transistor $Q_2$ has the base electrode and a collector electrode which the resistor $R_5$ is connected therebetween. The transistor $Q_1$ has an emitter electrode connected to the positive load current line 50p and has a base electrode and a collector electrode which are directly connected to each other. As a result, the transistor $Q_1$ acts as a constant current source. The resistors $R_1$ and $R_2$ are connected at a node which is connected to an end of the resistor $R_6$ while the resistors $R_2$ and $R_3$ are connected at a node which is connected to an end of the resistor $R_7$. The resistor $R_6$ has another end which produces a voltage (a cell detected voltage) ($V_{cc}$) directly proportional to the cell voltage $V_{cc}$ of the electric cell 100 while the resistor $R_7$ has another end which produces a voltage ($V_{th}$) directly proportional to the controllable threshold voltage $V_{th}$. The other end of the resistor $R_7$ is supplied with the control current $I_c$ from the overdischarge detection hysteresis circuit 40a. At any rate, a circuit, which consists of the transistor $Q_1$, the resistors $R_1$, $R_2$, $R_3$, $R_4$, and $R_5$, the transistor $Q_2$, and the resistors $Q_6$ and $Q_7$, serves as an arrangement for detecting the cell voltage $V_{cc}$ of the electric cell 100 to generate the cell detected voltage and for setting the controllable threshold voltage $V_{th}$.

In the example being illustrated, the resistors $R_1$, $R_2$, $R_3$, $R_4$, $R_5$, $R_6$, and $R_7$ have resistances of 2.6 MΩ, 140 kΩ, 1.8 MΩ, 6.2 MΩ, 2 MΩ, 360 kΩ, and 360 kΩ, respectively. Under such a condition, the voltage ($V_{th}$) directly proportional to the controllable threshold voltage $V_{th}$ is represented by an equation (4) as follow:

$$(V_{th}) = (V_T \ln 8 - I_c \cdot R_7) \times \frac{R_1 + R_2 + R_3}{R_2} + V_F(Q_1) + 1.32 V_F(Q_2) \quad (4)$$

where $V_T$ represents a thermal voltage which is represented by $V_T = kT/q$ (where k represents Boltzmann's constant, T represents absolute temperature, and q represents a capacitance of an electric charge), $V_F(Q_1)$ represents a forward bias voltage of the transistor $Q_1$, and $V_F(Q_2)$ represents a forward bias voltage of the transistor $Q_2$.

In the manner which will later become clear, the control current $I_c$ changes in dependency on the voltage drop $V_c$ in the discharge control switch 20. Inasmuch as the resistor $R_7$ has a constant resistance, the controllable threshold voltage $V_{th}$ varies in response to the control current Ic in accordance with the abovementioned equation (4).

The transistor $Q_3$ has an emitter electrode connected to the positive load current line 50p and has a base electrode connected to the base electrode of the transistor $Q_1$. The transistor $Q_3$ is operable as a constant current source. The transistor $Q_3$ has a collector electrode which is connected to emitter electrodes of the transistors $Q_5$ and $Q_6$. The transistor $Q_5$ has a base connected to the resistor $R_7$ while the transistor $Q_6$ has a base electrode connected to the resistor $R_6$. The transistor $Q_5$ has a collector electrode connected to a collector electrode of the transistor $Q_7$ while the transistor $Q_6$ has a collector electrode connected to a collector electrode of the transistor $Q_8$. The transistors $Q_7$ and $Q_8$ have base electrodes which are directly connected to each other and which is connected to a collector electrode of the transistor $Q_7$. The transistors $Q_7$ and $Q_8$ compose a current mirror circuit. A circuit, which consists of the transistors $Q_3$, $Q_5$, $Q_6$, $Q_7$, and $Q_8$, serves as a voltage comparing section for comparing the cell detected voltage ($V_{cc}$) with the voltage ($V_{th}$) directly proportional to the controllable threshold voltage $V_{th}$. The collector electrode of the transistor $Q_8$ is an output end of the voltage comparing section.

The transistor $Q_4$ has an emitter electrode connected to the positive load current line 50p and has a base electrode connected to the base electrode of the transistor $Q_1$. The transistor $Q_4$ acts as a constant current source. The transistor $Q_4$ has a collector electrode connected to a collector electrode of the transistor $Q_9$. The transistor $Q_9$ has a base electrode connected to the output end of the voltage comparing section and has an emitter electrode which is grounded. The collector electrode of the transistor $Q_9$ is connected to a current mirror circuit which comprises the transistors $Q_{10}$ and $Q_{11}$. More specifically, the collector electrode of the transistor $Q_9$ is connected to a collector electrode of the transistor $Q_{10}$ and is connected to base electrodes of the transistors $Q_{10}$ and $Q_{11}$. The transistors $Q_{10}$ and $Q_{11}$ have emitter electrodes which are grounded. The transistor $Q_{11}$ has a collector electrode connected to a constant current source in the overdischarge detection hysteresis circuit 40a which will later be described. A circuit, which consists of the transistors $Q_4$, $Q_9$, $Q_{10}$, and $Q_{11}$, serves as an output section for amplifying and outputting an output of the voltage comparing section. The collector electrode of the transistor $Q_{11}$ is an output end of the output section that is connected to a control terminal (a gate electrode) of the discharge control switch 20 (FIG. 8). In the output section, the current mirror circuit comprising the transistors $Q_{10}$ and $Q_{11}$ may be omitted.

The overdischarge detection hysteresis circuit 40a comprises a plurality of resistors $R_8$ and $R_9$, and a plurality of transistors $Q_{12}$, $Q_{13}$, $Q_{14}$, $Q_{15}$, $Q_{16}$, $Q_{17}$, and $Q_{18}$.

The transistor $Q_{12}$ has an emitter electrode connected to the positive load current line 50p and has a base electrode and a collector electrode which are directly connected to each other. The transistor $Q_{12}$ is operable as the above-mentioned constant current source. The collector electrode of the transistor $Q_{12}$ is connected to the collector electrode of the transistor $Q_{11}$ in the overdischarge detection circuit 10a. The transistor $Q_{13}$ has an emitter electrode connected to the positive load current line 50p and has a base electrode connected to the base electrode of the transistor $Q_{12}$. The transistor $Q_{13}$ acts as a constant current source for allowing to flow a constant current $I_0$.

The transistor $Q_{13}$ has a collector electrode connected to a current mirror circuit which comprises the transistors $Q_{14}$ and $Q_{15}$. More particularly, the collector electrode of the transistor $Q_{13}$ is connected to collector electrodes and base electrodes of the transistors $Q_{14}$ and $Q_{15}$. It is assumed that the transistor $Q_{15}$ has an emitter electrode through which a current indicated by $I_1$ flows while the transistor $Q_{14}$ has an emitter electrode through which a current indicated by $I_2$ flows. Under the circumstances, the constant current $I_0$ of the constant current source (the transistor $Q_{13}$) is separated into the currents $I_1$ and $I_2$ by the current mirror circuit in question as represented by the following equation (5):

$$I_0 = I_1 + I_2. \tag{5}$$

That is, the current mirror circuit comprising the transistors $Q_{14}$ and $Q_{15}$ separates the constant current $I_0$ into the currents $I_1$ and $I_2$ which are called first and second separated currents, respectively.

The emitter of the transistor $Q_{14}$ is supplied with the particular voltage $V_c$ through the transistor $Q_{16}$ having a base electrode and a collector electrode which are short-circuited. On the other hand; the emitter electrode of the transistor $Q_{15}$ is connected to a current mirror circuit which comprises the transistors $Q_{17}$ and $Q_{18}$. More specifically, the emitter electrode of the transistor $Q_{15}$ is connected to a collector electrode and a base electrode of the transistor $Q_{17}$ and is connected to a base electrode of the transistors $Q_{18}$. The transistor $Q_{17}$ has an emitter electrode which is grounded through the resistor $R_8$ while the transistor $Q_{18}$ has an emitter electrode which is grounded through the resistor $R_9$. In the example being illustrated, the resistors $R_8$ and $R_9$ have resistances of 400 k$\Omega$ and 80 k$\Omega$, respectively.

A voltage $V(Q_{14})$ between the emitter electrode of the transistor $Q_{14}$ and the ground GND is herein called a voltage of the transistor $Q_{14}$ while a voltage $V(Q_{15})$ between the emitter electrode of the transistor $Q_{15}$ and the ground GND is herein called a voltage of the transistor $Q_{15}$. The voltage $V(Q_{14})$ of the transistor $Q_{14}$ and the voltage of the transistor $Q_{15}$ are represented by the following equations (6) and (7):

$$V(Q_{14}) = V_T ln \frac{I_2}{I_s} + V_F(Q_{16}) + V_c \tag{6}$$

$$V(Q_{15}) = V_T ln \frac{I_1}{I_s} + V_F(Q_{17}) + I_3 \cdot R_8 \tag{7}$$

where $I_r$ represents a reverse saturation current, $V_F(Q_{16})$ represents a forward bias voltage of the transistor $Q_{16}$, and $V_F(Q_{17})$ represents a forward bias voltage of the transistor $Q_{17}$.

In addition, the voltage $V(Q_{14})$ of the transistor $Q_{14}$ and the voltage $V(Q_{15})$ of the transistor $Q_{15}$ are equal to each other. That is, the following equation (8) holds:

$$V(Q_{14}) = V(Q_{15}). \tag{8}$$

The above-mentioned equation (6) proves that the first separated current $I_1$ is determined on the basis of the particular voltage $V_c$.

Figure 10:
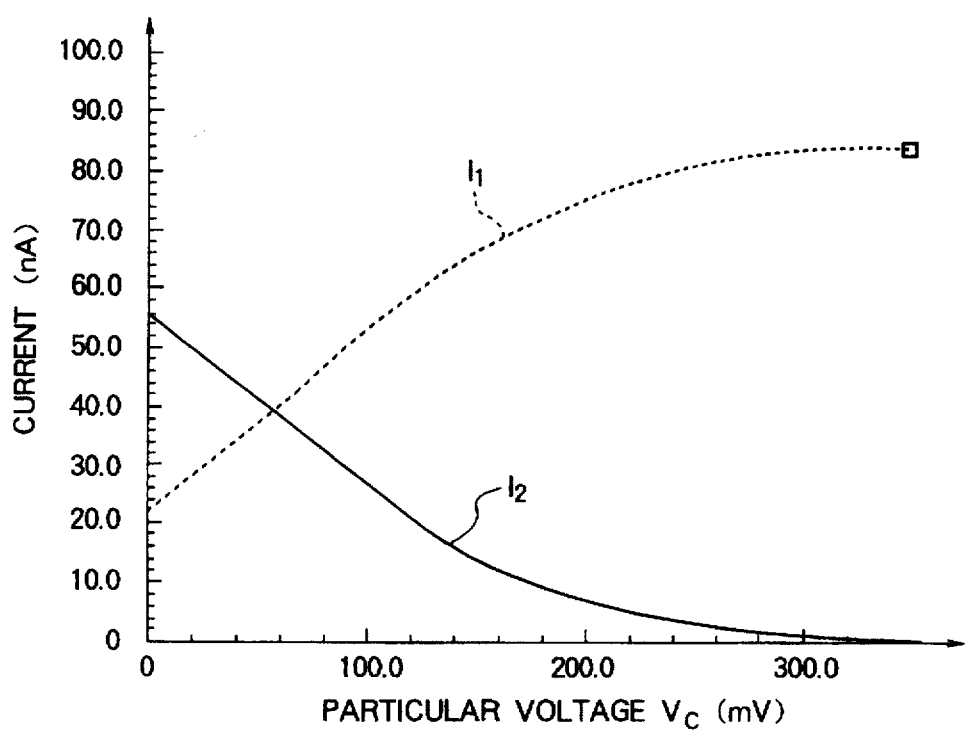
FIG. 10 is a view of characteristic of a voltage drop in a semiconductor switch versus first and second separated currents in an overdischarge detection hysteresis circuit illustrated in FIG. 9.

FIG. 10 shows characteristics of the particular voltage $V_c$ versus the first and the second separated current $I_1$ and $I_2$. FIG. 10 proves that the first separated current $I_1$ is saturated when the particular voltage $V_c$ is higher than a predetermined voltage of, for example, 300 [nV] in a case exemplified in FIG. 10 although the first separated current $I_1$ becomes large in dependency on the particular voltage $V_c$.

Figure 11:
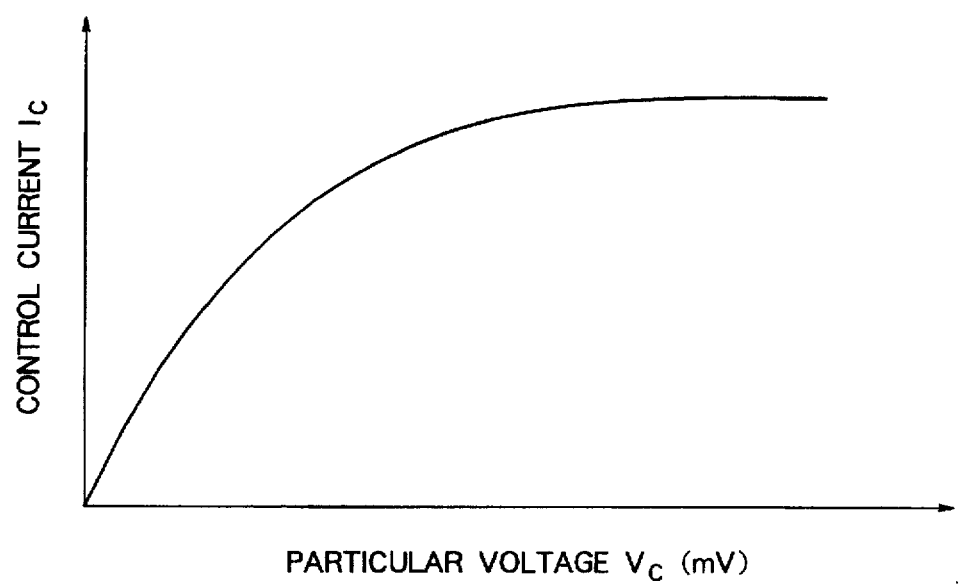
FIG. 11 is a view of characteristic of the voltage drop in the semiconductor switch versus a control current in the overdischarge detection hysteresis circuit illustrated in FIG. 9.

As a result, the control current $I_c$ for controlling the controllable threshold voltage $V_{th}$ has a characteristic as shown in FIG. 11. More specifically, in a region where the particular voltage $V_c$ is low (an active region of the transistor $Q_{14}$ in the current mirror circuit consisting of the transistors $Q_{14}$ and $Q_{15}$), the control current $I_c$ is determined so as to current-amplify the first separated current. $I_1$ represented by the abovementioned equations by the current mirror circuit consisting of the transistors $Q_{17}$ and $Q_{18}$. That is, the control current $I_c$ is represented by the following equation (9):

$$I_c = \frac{I_1}{exp \frac{1}{V_T} (I_c \cdot R_9 - I_1 \cdot R_8)} \tag{9}$$

On the other hand, in another region where the particular voltage $V_c$ is high (a saturation region of the transistor $Q_{14}$ in the current mirror circuit consisting of the transistors $Q_{14}$ and $Q_{15}$), the control current $I_c$ is nearly equal to the constant current $I_0$. Thus the control current $I_c$ is determined so as to current-amplify the first separated current $I_1$ by the current mirror circuit consisting of the transistors $Q_{17}$ and $Q_{18}$. That is, the control current $I_c$ is represented by the following equation (10):

$$I_c = \frac{I_0}{exp \frac{1}{V_T} (I_c \cdot R_9 - I_0 \cdot R_8)} \tag{10}$$

Figure 12:
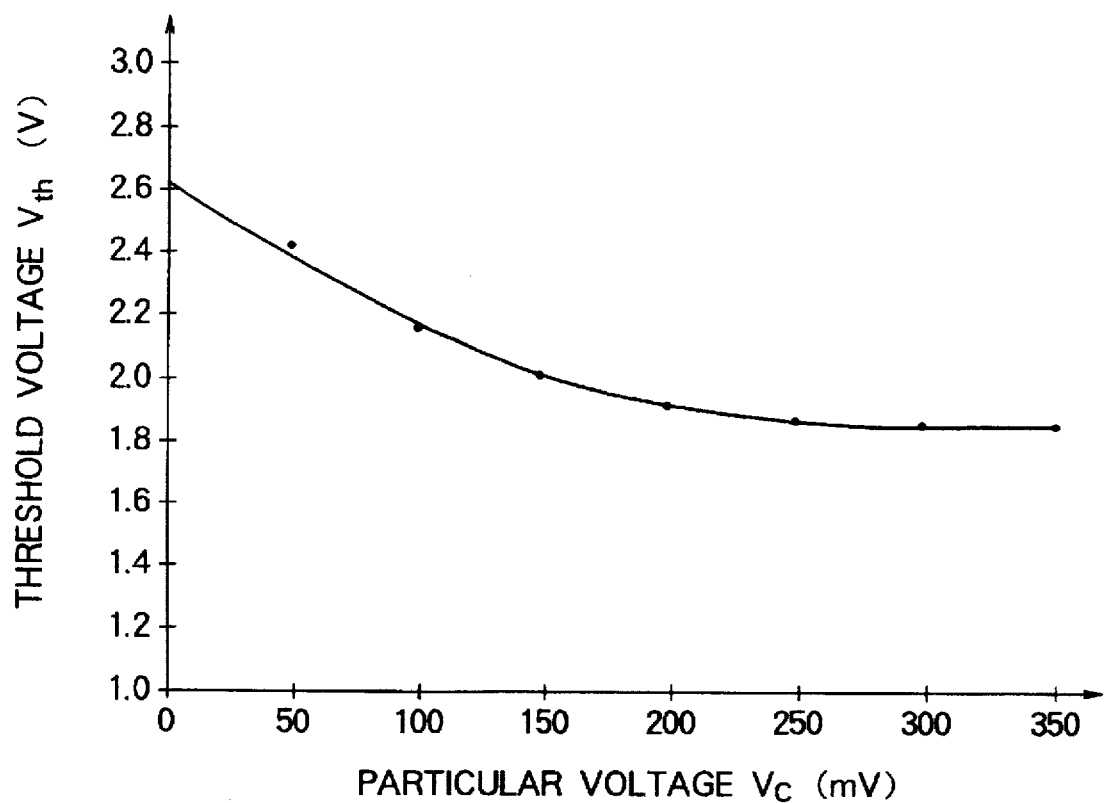
FIG. 12 is a view of characteristic of the voltage drop in the semiconductor switch versus a threshold voltage in the overdischarge detection circuit illustrated in FIG. 9.

Accordingly, the controllable threshold voltage $V_{th}$ has a characteristic as shown in FIG. 12 with the particular voltage $V_c$. As described above, it is in this embodiment possible to clamp the controllable threshold voltage $V_{th}$ when the particular voltage $V_c$ is higher than the predetermined voltage.

Figure 13:
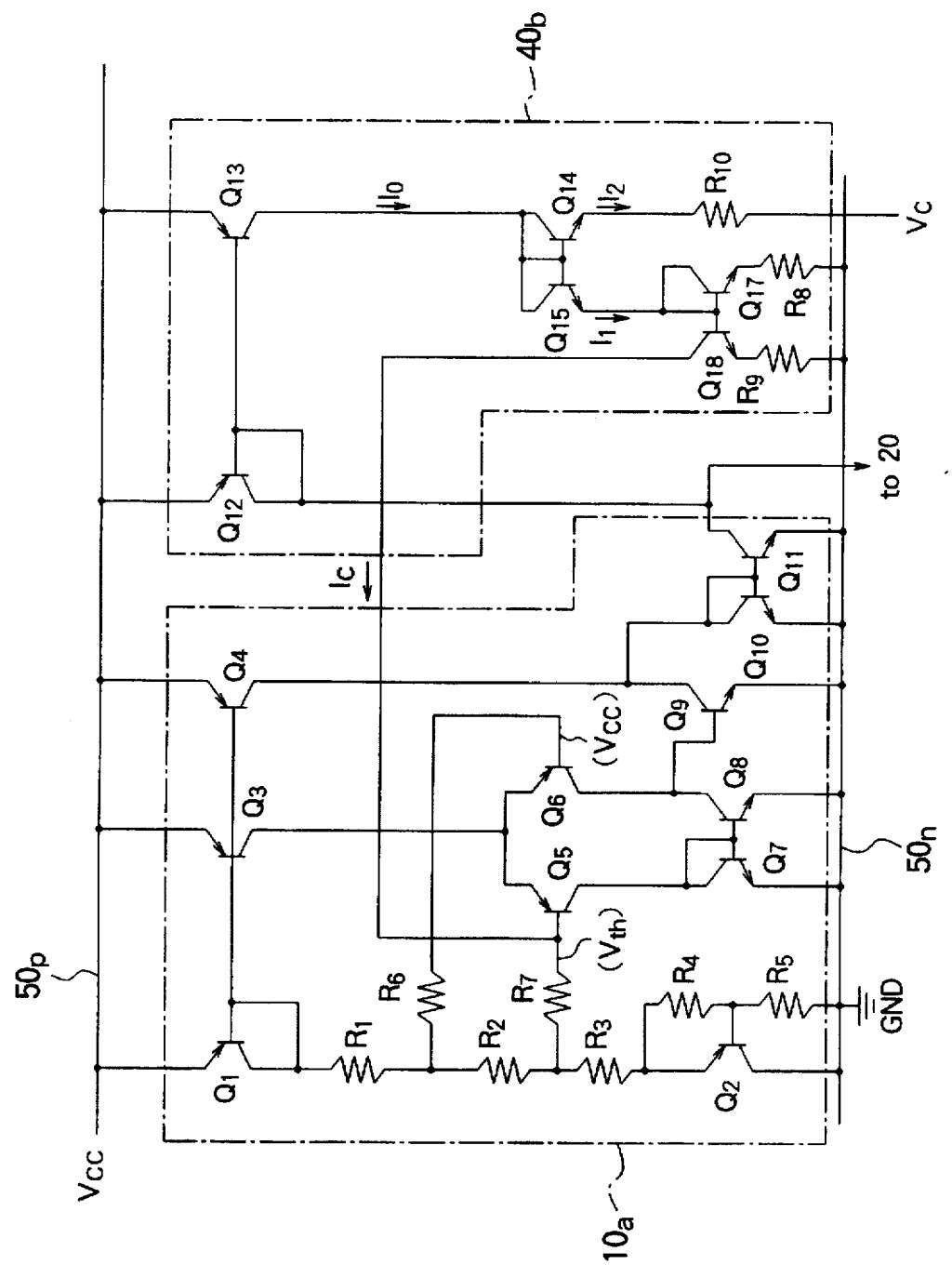
FIG. 13 is a circuit diagram of another example of an overdischarge detection circuit illustrated in FIG. 8 in detail.

FIG. 13 shows a modification of the overdischarge detection hysteresis circuit. The illustrated overdischarge detection hysteresis circuit is depicted at a reference sign of 40b. The overdischarge detection hysteresis circuit 40b is similar in structure to the overdischarge detection hysteresis circuit 40 except that it provides with a resistor $R_{10}$ in lieu of the transistor $Q_{16}$. In the example being illustrated, the voltage $V(Q_{14})$ of the transistor $Q_{14}$ is represented by the following equation (6a) where $V_F(Q_{16})$ is replaced with $(I_2 \cdot R_{10})$ in the above-mentioned equation (6):

$$V(Q_{14}) = V_T \ln \frac{I_2}{I_s} + I_2 \cdot R_{10} + V_c \tag{6a}$$

While this invention has thus far been described in conjunction with a few preferred embodiments thereof, it will now be readily possible for those skilled in the art to put this invention into use in various other manners. For example, in addition to the embodiments described above, the overdischarge detection hysteresis circuit may also have the characteristic regarding the control current $I_c$ as illustrated in FIG. 11 so that the controllable threshold voltage is clamped when the particular voltage $V_c$ is higher than the predetermined voltage. In addition, this invention is applicable not only to lithium ion cells but also to any other chargeable electric cell which requires protection against overdischarge.

What is claimed is:

1. An overdischarge detection device for use in a cell unit including a chargeable electric cell having a cell voltage which is supplied to a load through positive and negative load current lines to pass a load current through the load, said overdischarge detection device comprising:

an overdischarge detection circuit connected between the positive and the negative load current lines, said overdischarge detection circuit including a voltage comparing section having an input terminal for the cell voltage of the chargeable electric cell and a threshold terminal for a controllable threshold voltage for prohibiting discharging operation, said voltage comparing section comparing the cell voltage with the controllable threshold voltage to produce a detection signal when the cell voltage falls below the controllable threshold voltage; and an adjusting device, connected to said overdischarge detection circuit, for detecting a particular voltage of a specified part in the cell unit that corresponds to the load current varying in response to relative weight of the load, and for adjusting the controllable threshold voltage based on the particular voltage;

wherein said adjusting device comprises an overdischarge detection hysteresis circuit for changing the controllable threshold voltage by supplying a control current to said overdischarge detection circuit based on the particular voltage, and for clamping the controllable threshold voltage when the particular voltage is higher than a predetermined voltage.

2. An overdischarge detection device as claimed in claim 1, further comprising a semiconductor switch which is supplied with the detection signal produced by the voltage comparing section of said overdischarge detection circuit when the cell voltage of the chargeable electric cell falls below the controllable threshold voltage, said semiconductor switch having a source electrode and a drain electrode which are connected to the negative load current line, wherein the particular voltage is a voltage between the source electrode and the drain electrode in the semiconductor switch.

3. An overdischarge detection device as claimed in claim 2, wherein said adjusting device further comprises a voltage/current conversion circuit for converting the particular voltage into the control current, and said control current is supplied to the input terminal of the voltage comparing section.

4. An overdischarge detection device as claimed in claim 2, wherein said overdischarge detection hysteresis circuit comprises:

a constant current source, connected to the positive load current line, for pouring a constant current;

a first current mirror circuit, connected to the constant current source, for separating the constant current into first and second separated currents;

a second current mirror circuit, connected to the first current mirror circuit, for current-amplifying the first separated current into the control current, said second current mirror circuit supplying the control current to said overdischarge detection circuit;

first and second resistors connected between said second current mirror circuit and the negative load current line; and a transistor, connected between said first current mirror circuit and the specified part, for passing the second separated current to the specified part.

5. An overdischarge detection device as claimed in claim 2, wherein said overdischarge detection hysteresis circuit comprises:

a constant current source, connected to the positive load current line, for pouring a constant current;

a first current mirror circuit, connected to the constant current source, for separating the constant current into first and second separated currents;

a second current mirror circuit, connected to the first current mirror circuit, for current-amplifying the first separated current into the control current, said second current mirror circuit supplying the control current to said overdischarge detection circuit;

first and second resistors connected between said second current mirror circuit and the negative load current line; and a third resistor, connected between said first current mirror circuit and the specified part, for passing the second separated current to the specified part.

6. An overdischarge prevention device for use in a cell unit including a chargeable electric cell having a cell voltage which is supplied to a load through positive and negative load current lines to pass a load current through the load, said overdischarge prevention device comprising:

an overdischarge detection circuit connected between the positive and the negative load current lines, said overdischarge detection circuit including a voltage comparing section having an input terminal for the cell voltage of the chargeable electric cell and a threshold terminal for a controllable threshold voltage for prohibiting discharging operation, said voltage comparing section comparing the cell voltage with the controllable threshold voltage to produce a detection signal when the cell voltage falls below the controllable threshold voltage;

a switch circuit, connected to said overdischarge detection circuit, for stopping, in response to the detection signal, supply of the cell voltage from the electric cell to the load; and an adjusting device, connected to said overdischarge detection circuit, for detecting a particular voltage of a specified part in the cell unit that corresponds to the load current varying in response to relative weight of the load, and for adjusting the controllable threshold voltage based on the particular voltage;

wherein said adjusting device comprises an overdischarge detection hysteresis circuit for changing the controllable threshold voltage by supplying a control current to said overdischarge detection circuit based on the particular voltage, and for clamping the controllable threshold voltage when the particular voltage is higher than a predetermined voltage.

7. An overdischarge prevention device as claimed in claim 6, wherein said switch circuit comprises a semiconductor switch which is supplied with the detection signal, and said semiconductor switch has a source electrode and a drain electrode which are connected to the negative load current line, and wherein the particular voltage is equal to a voltage between the source electrode and the drain electrode in the semiconductor switch.

8. An overdischarge prevention device as claimed in claim 7, wherein said adjusting device further comprises a voltage/current conversion circuit for converting the particular voltage into the control current, and said control current is supplied to the input terminal of the voltage comparing section.

9. An overdischarge prevention device as claimed in claim 7, wherein said overdischarge detection hysteresis circuit comprises:

a constant current source, connected to the positive load current line, for pouring a constant current;

a first current mirror circuit, connected to the constant current source, for separating the constant current into first and second separated currents;

a second current mirror circuit, connected to the first current mirror circuit, for current-amplifying the first separated current into the control current, said second current mirror circuit supplying the control current to said overdischarge detection circuit;

first and second resistors connected between said second current mirror circuit and the negative load current line; and a transistor, connected between said first current mirror circuit and the predetermined part, for passing the second separated current to the predetermined part.

10. An overdischarge prevention device as claimed in claim 7, wherein said overdischarge detection hysteresis circuit comprises:

a constant current source, connected to the positive load current line, for pouring a constant current;

a first current mirror circuit, connected to the constant current source, for separating the constant current into first and second separated currents;

a second current mirror circuit, connected to the first current mirror circuit, for current-amplifying the first separated current into the control current, said second current mirror circuit supplying the control current to said overdischarge detection circuit;

first and second resistors connected between said second current mirror circuit and the negative load current line; and a third resistor, connected between said first current mirror circuit and the predetermined part, for passing the second separated current to the predetermined part.

* * * * *